Nov. 15, 1960  C. KARR, JR., ET AL  2,960,479
PREPARATION OF ADSORBENTS FOR A SPECIFIC ACTIVITY
Filed Nov. 7, 1955
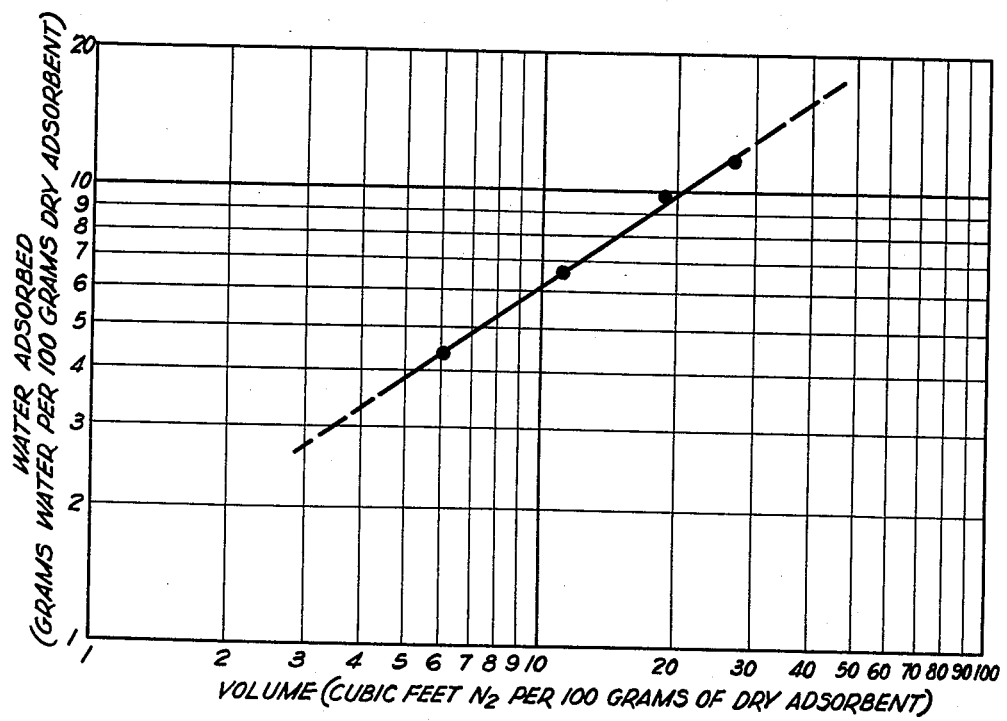
INVENTORS
CLARENCE KARR, JR.
WILLIAM D. WEATHERFORD, JR.
JAMES H. WRIGHT
BY
THEIR ATTORNEY United States Patent Office 2,960,479
Patented Nov. 15, 1960

2,960,479

PREPARATION OF ADSORBENTS FOR A SPECIFIC ACTIVITY

Clarence Karr, Jr., Morgantown, W. Va., and William D. Weatherford, Jr., Pittsburgh, and James H. Wright, Verona, Pa., assignors to Gulf Research & Development Company, Pittsburgh, Pa., a corporation of Delaware Filed Nov. 7, 1955, Ser. No. 545,146

5 Claims. (Cl. 252—463)

This invention relates to a process for preparing solid adsorbents of varying degrees of adsorptivity and more particularly to a process for preparing solid adsorbents by selectively and reproducibly controlling their adsorptive capacity.

Solids adsorbents vary in their adsorptive capacity. Factors such as surface area, pore size and pore size distribution, the nature of the adsorbent and adsorbate, temperatures and pressures of adsorption, all affect the amount of adsorption. It is known, for example, that the degree of adsorptivity of any specific solid adsorbent varies with respect to any given adsorbate. Of the factors affecting adsorptive capacity, the nature, i.e., adsorptive strength of the adsorbent itself has been the most difficult to control with respect to the adsorptive capacity required. This is, perhaps, best demonstrated in the use of solid adsorbents in chromatographic analysis. The chromatographic separation of two materials of nearly the same adsorbability is frequently quite difficult unless an adsorbent of exactly the proper adsorptive capacity is chosen. Thus a weak adsorbent, for example, calcium carbonate or sucrose, may be required to separate two strongly adsorbed materials, and a strong adsorbent, for example, activated alumina, charcoal or bauxite, may be necessary for the separation of weakly adsorbed materials. For this reason, it is common practice to employ a wide variety of adsorbents of specifically different chemical identities, depending on the nature of the materials to be separated. It would therefore be desirable to be able so to vary the adsorptive capacity of a single specific adsorbent as to have a series of adsorbents, graded as to adsorptive capacity. It would also be desirable reproducibly to tailor, so to speak, the adsorptive capacity of an adsorbent particularly to adapt it for a specific application.

We have now discovered that the adsorptive capacity of a solid adsorbent can be reproducibly modified by fluidizing said adsorbent in contact with a predetermined amount of a gaseous substance adsorbable thereon. By controlling the amounts of gaseous substance adsorbed on the solid adsorbent in the manner described, we are able selectively and reproducibly to vary the adsorptive capacity of the adsorbent to adapt it for any specific application desired.

Our process is applicable to the preparation of adsorbents of varying degrees of adsorptive activity or capacity from any solid adsorbent including the well known activated aluminas, bauxites, silica gels, magnesium silicates, silica-alumina composites, clays, fuller's earths, attapulgite, montmorillonite, bentonite, diatomaceous earths, charcoals, activated carbons, activated bone, ion-exchange resins and many other known natural and synthetic adsorbents. In accordance with our invention, we can reproducibly control and vary the activity of any of such adsorbents between their maximum and minimum activities.

In the process of our invention, the adsorptive capacity of an activated solid adsorbent is controllably varied by adsorbing thereon in predetermined amount any adsorbable gaseous substance while the solid adsorbent is maintained in the fluidized state. The gaseous substances which can be employed include normally gaseous materials, and materials which are liquids or solids at normal temperatures and pressures but which vaporize or sublime to yield gases at the conditions of adsorption, and which are adsorbable on the solid adsorbent under the conditions of contact between the adsorbent and gaseous substance. Insofar as the process of the present invention is concerned, the specific nature of the adsorbable gas is immaterial and will depend primarily on the use to which the processed adsorbent will be put. By way of example, we can vary the adsorptive capacity of activated aluminas or bauxites by adding controlled amounts of water vapor thereto. Similarly, catalytic activity which, of course, is dependent on adsorption phenomena, can be varied or altered by adsorbing on a solid adsorbent catalyst vaporous, vaporizable or sublimable promoter or catalytic materials; for example, sublimed molybdenum oxide can be adsorbed in controlled amounts on silica-alumina catalyst composites. Other materials such as iodine, ammonia, alcohols and amines can also be adsorbed on solid adsorbents in accordance with our process.

The absorbents employed in our process can be of any particle size or mesh capable of being fluidized, as is known in the art. Particles of from 40 to 500 mesh are exemplary. We have used a range of adsorbent particle size of from about 80 to 200 mesh most satisfactorily. The velocity, or mass flow, of the fluidizing gas should be sufficient to keep the particles homogeneously distributed in the fluidized state throughout the fluidization column, as is well known in the art of fluidized solids. As is known, the mass flow of the fluidizing gas will vary with such factors as particle size and density of the adsorbent. In the actual practice of one embodiment of our invention, we have used mass flows ranging from approximately 20 to 78 pounds of nitrogen gas per hour per square foot of column for an activated alumina having a bulk density of 55#/cu. ft., and a particle size ranging from about 80 to 200 mesh.

Any suitable gas can be employed as the fluidizing gas in our process. Such fluidizing gas can be the adsorbable gas itself, a gas that is not adsorbed and is therefore inert with respect to the solid adsorbent, or a gas which although adsorbed is displaced by the adsorbable gas it is desired to place on the adsorbent. However, for the purpose of facilitating control of the amount of adsorbable gas, it is preferred to employ an inert gas as the fluidizing gas, and it is also preferred to employ the fluidizing gas as a carrier for the adsorbable gas. In the latter instance, particularly where a vaporizable or sublimable substance furnishes the adsorbable gas, the carrier gas is passed through a body of the vaporizable or sublimable substance under such conditions of temperature and pressure as preferably to saturate the carrier gas with vapors of the adsorbable gas under such conditions. In this manner, control of the amount of adsorbable gas contacted with the fluidized adsorbent is facilitated.

It is an essential feature of this invention that the amount of adsorbable gas adsorbed on the fluidized solid adsorbent is controlled to yield an adsorbent of the desired adsorptive capacity. It is also a feature of the invention that, once having established the degree of adsorptive capacity desired in the adsorbent, new batches of adsorbent having the same adsorptive capacity can be prepared in accordance with our process by controlling the amount of adsorbable gas contacted with a determined amount of adsorbent. As will be brought out in detail in the specific examples, once having determined the amounts of adsorbable gas which have been adsorbed per unit of adsorbent and the corresponding amounts of adsorbable gas contacted with the adsorbent per unit thereof, under certain conditions of temperature and pressure of adsorption, it is possible to predict and control the amount of adsorbable gas which will be adsorbed on the adsorbent for any given amount of adsorbable gas contacted with the adsorbent under such conditions. It is thus possible to control reproducibly the adsorptive capacity of the adsorbent.

The adsorbents employed in our process are activated and not adventitiously contaminated with extraneous substances adsorbed thereon prior to contact with an adsorbable gas in accordance with the invention. This eliminates any variation in adsorptive capacity due to such adventitiously adsorbed materials.

Activation can be carried out by any known method, for example, by heating the adsorbent for the required time and temperature. Activating conditions may differ with each specific adsorbent. Thus in the case of bentonites, montmorillonites and activatable clays, activation can be accomplished by treating with mineral acids; charcoals can be activated by treating with steam, etc. In the preparation of activated alumina or alumina-containing materials, in which the alumina is present in the form of a hydrate, activation temperatures of from 100° to 800° C., depending on the end use of the alumina, are generally used to eliminate or drive off combined water as well as other volatile substances present which are not chemically combined. It should be noted that in the case of hydrated adsorbents the dehydration should not be carried out to a point where the maximum adsorptive capacity of the substance is fundamentally impaired. Processes for preparing the various activated adsorbents themselves are well known in the prior art and resort may be had thereto for further details; our invention is directed toward the modification of the adsorptive characteristics of such activated adsorbents.

The rate and amount of adsorption of an adsorbable gas on a solid adsorbent can generally be varied by the conditions of temperature and pressure employed. For any given adsorbent-adsorbate pair there exists an adsorption isotherm determined by a set of temperatures and pressures. An increase in pressure generally results in an increase of adsorption while an increase in temperature generally decreases such adsorption. In the process of our invention, the temperature and pressure of the adsorption are not critical; however, once such conditions are established for the production of an adsorbent of a specific adsorptive capacity, they should be adhered to in order to obtain reproducible results. In the practice of our invention, we have used pressures ranging from atmospheric to 10 pounds per square inch gauge and temperatures of from room temperature to 150° F. However, higher or lower temperatures and pressures can be employed.

The amount of adsorbable gas adsorbed on the adsorbent is so controlled as to yield the desired modification in adsorptive capacity of the adsorbent. This is accomplished by controlling the amount of adsorbable gas passed into contact with the adsorbent. It is to be noted that not all of the adsorbable gas contacted with the adsorbent is adsorbed thereon. Therefore, enough adsorbable gas is passed into contact with the adsorbent to result in the desired modification in adsorptive capacity. Since the amount of adsorbable gas required will vary with the nature of the gas, the nature of the solid adsorbent, the rate of flow of the gas and the temperature and pressure of the adsorption, it is impossible to generalize on the amounts of adsorbable gas to employ in each instance. However, as stated, enough adsorbable gas is employed under the conditions selected to yield the desired modification in adsorptive capacity of the adsorbent. This can be determined routinely by one skilled in the art, and once determined can be reproducibly repeated to yield an adsorbent of the same adsorptive capacity. It will be understood that it is undesirable to employ so much adsorbable gas that the adsorbent is completely saturated and loses substantially all of its adsorptive capacity.

In the actual practice of our invention we prepared an alumina of controlled adsorptive capacity by fluidizing the activated alumina at room temperature and substantially atmospheric pressure with nitrogen saturated with water vapor at substantially room temperature. A meter at the exit end of the fluidizing column was used to check the total volume of gas. After a predetermined amount of fluidizing gas was passed through the fluidizing column, the alumina was sampled to determine the amount of water vapor adsorbed. This latter determination was accomplished by weighing and then heating the sample of the alumina to drive off the adsorbed water; the sample was then reweighed and the amount of water driven off was determined. It was found that the alumina had adsorbed a definite amount of water vapor and that the adsorption was substantially homogeneously accomplished, that is, the alumina at any portion of the fluidization column had substantially the same water content. The adsorptive capacity of the alumina was thus effectively modified.

In another embodiment of our invention an alumina of controlled adsorptive capacity is prepared by using steam itself as the fluidizing gas. In this case a definite amount of steam is passed through the column to fluidize the alumina and to obtain an alumina of modified adsorption capacity having a uniform water content. Since a condensible gas is used as the fluidizing gas, the column is advantageously swept with an inert gas at the end of the run in order to prevent local condensation and/or occlusion of the steam which can give false results. It is also desirable in this case to bring the adsorbent to the desired adsorptive temperature above the condensation temperature of the steam by fluidizing with a heated inert gas prior to passage of the steam therethrough.

The process of our invention is further illustrated in the following specific examples which are not intended to limit the invention.

EXAMPLE I

A series of activated aluminas of differing adsorptive capacities were prepared as follows. Seventy (70) grams of an activated alumina having a particle size ranging from 80 to 200 mesh were fluidized in a glass column 22 mm. in diameter and 15 inches high. Prior to fluidization, the alumina was heated for 18 hours at 400° F. to insure complete removal of any extraneous adsorbed substances. Fluidization was accomplished by passing a substantially constant flow of nitrogen gas into the bottom of the fluidization column using a fritted glass disc as the distribution plate. Prior to passage into the column, the nitrogen gas was passed through water contactors for substantially saturating the nitrogen with water vapor, and a filter was interposed between the contactors and the fluidization column to remove any entrained liquid water from the gas stream. The water contactors were kept at substantially constant temperature and pressure. A wet test meter was used to record the volume and rate of flow of the total effluent from the fluidization column. Four (4) samples of the fluidized alumina of approximately 4 grams each were removed from the column at different periods during the run, and the amount of water vapor adsorbed after each period was determined by determining the loss of water after heating the samples to 400° F. The water content of the nitrogen prior to introduction of the column remained substantially constant throughout the run. The results are shown in Table I, below.

Table I

| Run No. | 70 g. adsorbent (Samples removed through this run) | Water Contactors | | H₂O Content of Nitrogen, g./cu. ft. | Total Gas Flow | | Percent H₂O Adsorbed on Alumina |
|---|---|---|---|---|---|---|---|
| | | Temp., °F. | Pressure, p.s.i.g. | | Rate, c.f.h. | Total, c.f. | |
| 1 | 1st sample | 86 | 0.4 | 1.24 | 4.20 | 4.33 | 4.16 |
| | 2nd sample | 87 | 0.4 | 1.28 | 4.08 | 7.95 | 6.32 |
| | 3rd sample | 87 | 0.4 | 1.28 | 4.05 | 13.05 | 9.08 |
| | 4th sample | 87 | 0.4 | 1.28 | 4.55 | 17.35 | 10.30 |

In order better to correlate the relationship between the water vapor adsorbed and the total gas flow (nitrogen and water vapor) the experimental values obtained for each sample were converted by calculation to a basis of 100 grams of dry alumina adsorbent. Table II shows the values obtained.

Table II

| Sample No. | Total Gas¹ Flow Per 100 Grams of Dry Alumina, Cubic Feet | Water Vapor Adsorbed Per 100 Grams Dry Alumina, Grams |
|---|---|---|
| 1 | 6.17 | 4.35 |
| 2 | 11.33 | 6.75 |
| 3 | 18.60 | 10.00 |
| 4 | 24.70 | 11.50 |

¹ Nitrogen containing 1.28 grams water vapor per cubic foot.

The drawing shows that, when the values in Table II are plotted against each other on log-log graph paper, a straight line is obtained. It is therefore possible to predict from this graph the amount of water vapor which will be adsorbed on activated alumina for any given volume of total gas flow under the conditions of temperature, pressure and water vapor content employed in the runs described above. Stated in another way, it is possible to predetermine the amount of water vapor to employ in the fluidizing gas to obtain an alumina having a specific amount of adsorbed water thereon and thus a desired adsorptive capacity.

EXAMPLE II

In order to check the reproducibility of our process another series of runs was made under substantially the same conditions as in Example I, except that the water content and rate of flow of the nitrogen fluidizing gas were varied. It will be noted that in these runs, only one sample was taken for each run. The results are shown in Table III, below.

Table III

| Run No. | Sample | Water Contactors | | H₂O Content of Nitrogen, g./cu. ft. | Total Gas Flow | | Percent H₂O Adsorbed on Alumina | Predicted H₂O Content |
|---|---|---|---|---|---|---|---|---|
| | | Temp., °F. | Pressure, p.s.i.g. | | Rate, c.f.h. | Total, c.f. | | |
| 1 | 70 g. adsorbent | 85 | 0.4 | 1.20 | 3.6 | 3.8 | 4.34 | 4.0 |
| 2 | do | 88 | 0.4 | 1.32 | 4.5 | 8.16 | 6.83 | 6.0 |
| 3 | do | 89 | 0.4 | 1.35 | 3.4 | 12.10 | 8.35 | 8.0 |
| 4 | do | 86 | 0.4 | 1.24 | 3.6 | 2.45 | 3.10 | 3.0 |
| 5 | do | 83 | 0.4 | 1.10 | 3.6 | 16.3 | 9.35 | 10.0 |

As evidence of the reproducibility of our process, attention is invited to the last two columns in the table. The last column shows the amounts of water vapor expected to be adsorbed on the alumina, as obtained from the graph in the drawing. As can be seen from the table, these values are in excellent agreement with the experimental values actually obtained.

The above examples show the efficacy of our process for preparing adsorbents of varied adsorptive capacity. The use of the fluid technique also results in the production of an adsorbent containing a uniform distribution of adsorbable gas. This feature is an important advantage of our process. Table IV below shows, for an activated alumina containing adsorbed water vapor, the uniformity of distribution of the water throughout the alumina. To demonstrate this uniformity, we removed several samples of alumina at various depths of the fluidized bed after fluidizing the alumina with a controlled amount of nitrogen containing a known amount of water vapor. The water content of each sample withdrawn was then determined.

Table IV
TEST FOR HOMOGENEOUS WATER CONTENT

| Position of bed from which sample was taken | Water Content, percent | Remarks |
|---|---|---|
| Top of bed | 6.20 | The top 5″ of the bed is well fluidized. |
| 1″ deep | 6.42 | |
| 2″ deep | 6.43 | |
| 3½″ deep | 6.42 | |
| 5″ deep | 6.40 | |
| Residue (bottom 10% of adsorbent bed) | 8.33 | This portion of the bed is not fluidized. |

From the above table it can be seen that the samples of alumina removed from the fluidized portion of the bed contained a substantially uniform distribution of water regardless of the portion of the fluidized bed from which the sample was removed. The residue or bottom 10 percent of the adsorbent bed was not fluidized completely due to the obstruction caused by the supporting porous disc used as a distribution plate in the column. The result is a non-uniform distribution of water. This indicates the superiority of employing a fluidized bed of adsorbent in our process, since when the adsorbent is not fluidized it is not possible to control the extent of adsorption satisfactorily.

Although we have described a batch process in the specific examples, cyclic or continuous processes can be employed. For example, in a cyclic process two or more fluidizing columns are used: while one column is being used to modify the adsorptive capacity of an adsorbent, another column is in the process of being emptied and/or charged. In a continuous process one or more columns are used and the activated adsorbent is continuously charged at any advantageous point, such as at the top of the fluidizing column, while the modified adsorbent is continuously withdrawn from a lower section of the column, after a predetermined residence time. All of the processes described hereinabove are particularly adapted to the preparation of modified adsorbents on a large scale without losing the advantages of selectivity and reproducibility in their preparation. In fact, we have repeated some of our experiments on a considerably larger scale and have found that our process is fully applicable to large scale preparations.

The modified adsorbents of our invention find many uses in fields involving adsorption such as chromatography, filtration, percolation and the like. Adsorbents of such degree of adsorptive capacity as is required for the application at hand can be readily and economically prepared. As has been indicated, in chromatographic processes strong adsorbents are required to separate weakly adsorbed materials, while weak adsorbents are needed for separating strongly adsorbed substances. It can be seen that by the process of our invention a series of adsorbents of intermediate or any desired activity can be prepared.

EXAMPLE III

To illustrate the advantages obtained with the modified adsorbents of our invention, we made comparative tests between an activated alumina and an alumina modified in accordance with our invention in the chromatographic separation of organic sulfur compounds from a crude oil fraction.

The activated alumina was heated for 18 hours at 400° F. prior to its use as an absorbent in the chromatographic separation. The modified alumina of our invention was prepared by the procedure specified in Example I, except that 600 grams of the activated alumina were used, the pressure in the water contactors was 5.4 p.s.i.g., the water content of the nitrogen gas was 0.94 gram per cubic foot, the rate of total gas flow was 11.4 cubic feet per hour, and the total gas contacting the fluidized alumina was 90.3 cubic feet. The modified alumina thus obtained had an adsorbed water content of 6.40 percent by weight. The glass fluidization column employed had a diameter of 2⅞ inches and was 25 inches high.

Two chromatographic columns were then prepared, one containing 100 ml. of the activated alumina, and the other containing 100 ml. of the modified alumina prepared as described above. The charge to each column was 5 ml. of a chromatographic eluate fraction of a crude oil, described hereinafter, diluted with 2 ml. of n-pentane. The above eluate fraction was obtained from a West Texas crude containing 1.40 percent by weight of total sulfur. The crude was chromatographed over an activated alumina, and eluted first with n-pentane and then with two successive portions of n-pentane and benzene, the first portion containing 3.33 percent of benzene by volume and the second portion containing 11.5 percent of benzene by volume. After stripping the eluant from the second elution with n-pentane and benzene, the resulting eluate contained 3.54 percent by weight of total sulfur. This eluate was employed as the charge stock in our comparative tests.

After adsorbing the charge stock on each of the adsorbents, i.e., the activated alumina and the modified alumina, in the two columns, each column was eluted with four successive portions of n-pentane, and then with benzene. The amount of n-pentane employed was such as to amount to exhaustive extraction; the first three portions were approximately 100 ml. each and the fourth portion was approximately 200 ml. The amount of benzene used was 150 ml. The results of the tests are shown in the following tables, Table V showing the data for the modified alumina of our invention, and Table VI showing the data for the activated alumina.

Table V

| Sample | Eluant | Stripped Eluate | | | |
|---|---|---|---|---|---|
| | | Description | Wt. percent of Charge | Molecular Wt. | Wt. percent S |
| Charge | | Yellow-orange, medium viscosity | 100 | 350 | 3.54 |
| 1-a | n-pentane | Light orange, high viscosity | 12.6 | 1,900 | 2.58 |
| 1-b | do | Yellow, medium viscosity | 40.0 | 500 | 2.39 |
| 1-c | do | Yellow | 22.7 | 250 | 4.09 |
| 1-d | do | Bright yellow | 9.9 | 310 | 3.78 |
| 2 | benzene | | | | |

Table VI

| Sample | Eluant | Stripped Eluate | | | |
|---|---|---|---|---|---|
| | | Description | Wt. Percent of Charge | Molecular Wt. | Wt. Percent S |
| Charge | | Yellow-orange, medium viscosity | 100 | 350 | 3.54 |
| 1-a | n-pentane | Bright Cloudy Yellow, High viscosity. | 10.4 | 1,900 | 2.59 |
| 1-b | do | Bright yellow, High viscosity | 15.3 | 1,600 | 2.82 |
| 1-c | do | Pale yellow, medium viscosity | 12.5 | 410 | 3.25 |
| 1-d | do | Very pale yellow, Low viscosity | 22.2 | 270 | 3.72 |
| 2 | benzene | Bright yellow, medium viscosity | 26.7 | 260 | 3.96 |

As may be seen from the above tables, the modified alumina (Table V) showed significantly different effects from the activated alumina (Table VI). Note the difference in properties of the otherwise comparable eluate fractions. Of especial significance and advantage is the fact that after an exhaustive elution with n-pentane of the modified alumina chromatographed material, all of the organic sulfur compounds were removed. This is demonstrated by the fact that benzene elution did not yield any more sulfur compounds. However, when an activated alumina is employed as the chromatographic adsorbent, exhaustive n-pentane elution does not remove all organic sulfur compounds, as shown by the eluate obtained with benzene in Table VI. In addition, it should also be noted that there is a striking difference in the amount of material elutable with pentane. Moreover, the pentane elution of the modified alumina was accomplished more rapidly and easily, a feature which is desirable in many separations. Obviously, the modified alumina of our invention shows strikingly different adsorption effects.

Resort may be had to such modifications and variations as fall within the spirit of the invention and the scope of the appended claims.

We claim:

1. A process for selectively controlling the adsorptive capacity of a solid adsorbent which comprises predetermining the amount of an adsorbable gaseous substance contacting a fluidized solid adsorbent in relation to the amount of said gaseous substance adsorbed on said adsorbent at a temperature below the initial activation temperature of the said adsorbent, thereafter fluidizing under substantially the same conditions a fresh solid adsorbent of the same nature employed in the preceding step in contact with said predetermined amount of said adsorbable gaseous substance, thereby controlling the amount of gaseous substance adsorbed on said fresh adsorbent and the adsorptive capacity of the latter.

2. A process in accordance with claim 1, wherein said adsorbent is fluidized with an inert gas containing said predetermined amount of said gaseous substance.

3. A process in accordance with claim 1, wherein said adsorbent is fluidized with a fluidizing gas consisting of said adsorbable gaseous substance.

4. A process in accordance with claim 1, wherein said adsorbent is fluidized with a mixture of at least two adsorbable gases, at least one of said gases being more strongly adsorbed and displacing the other, said more strongly adsorbed gas being used in said predetermined amount.

5. A process for selectively controlling the adsorptive capacity of an activated alumina which comprises predetermining the amount of water vapor contacting a fluidized activated alumina in relation to the amount of water vapor adsorbed on said alumina at a temperature below the initial activation temperature of the alumina, and thereafter fluidizing under substantially the same conditions dry activated alumina in contact with said predetermined amount of water vapor, thereby controlling the amount of water vapor adsorbed on the said dry alumina and its adsorptive capacity.

References Cited in the file of this patent

UNITED STATES PATENTS

| | | |
|---|---|---|
| 1,851,627 | Hartley | Mar. 29, 1932 |
| 2,474,868 | Shabaker | July 5, 1949 |
| 2,477,019 | Utterbach et al. | July 26, 1949 |
| 2,519,622 | Archibald et al. | Aug. 22, 1950 |
| 2,660,564 | Davis | Nov. 24, 1953 |
| 2,698,305 | Plank et al. | Dec. 28, 1954 |